United States Patent
Pal

(12) 
(10) Patent No.: US 6,353,629 B1
(45) Date of Patent: Mar. 5, 2002

(54) POLY-PATH TIME DOMAIN EQUALIZATION

(75) Inventor: Debajyoti Pal, Fremont, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/066,272

(22) Filed: Apr. 24, 1998

Related U.S. Application Data

(60) Provisional application No. 60/046,244, filed on May 12, 1997.

(51) Int. Cl.[7] .................................................. H04L 5/16
(52) U.S. Cl. ..................... 375/222; 375/229; 375/349; 375/350; 708/312; 708/323
(58) Field of Search ................................ 375/222, 229, 375/232, 260, 350, 347, 349; 708/301, 312, 316, 323; 379/93.32, 93.34

(56) References Cited

U.S. PATENT DOCUMENTS

| | | | | |
|---|---|---|---|---|
| 5,285,474 A | * | 2/1994 | Chow et al. | 375/13 |
| 5,317,596 A | * | 5/1994 | Ho et al. | |
| 5,400,322 A | * | 3/1995 | Hunt et al. | |
| 5,483,529 A | * | 1/1996 | Baggent et al. | 370/70 |
| 5,521,908 A | * | 5/1996 | Younce et al. | 370/32.1 |
| 5,673,290 A | * | 9/1997 | Cioffi | 375/260 |
| 5,870,432 A | * | 2/1999 | Kerckhove | 375/232 |
| 5,903,608 A | * | 5/1999 | Chun | 375/260 |
| 5,959,967 A | * | 9/1999 | Humphrey et al. | 370/208 |
| 5,995,568 A | * | 11/1999 | Molnar et al. | 375/354 |
| 6,081,502 A | * | 6/2000 | Paneth et al. | 370/210 |

OTHER PUBLICATIONS

American National Standards Institute (ANSI): "American National Standard for Telecommunications—Network and Customer Installation Interfaces—Asymmetric Digital Subscribed Line (ADSL) Metallic Interface", New York, Aug. 18, 1995.*

Naofal N.W. Al–Dhahir, "Optimized–Transmitter Reduced–Complexity MMSE–DFE Under Finite–Length Constraints", PhD. Dissertation, Stanford University, Jun. 1994.*

Constantinos Papadias, "Methods for Blind Equalization and Identification of Linear Channels", PhD. Thesis, L'Ecole Nationale Superieure des Telecommunications, Mar. 1995.*

* cited by examiner

Primary Examiner—Stephen Chin
Assistant Examiner—Dac V. Ha
(74) Attorney, Agent, or Firm—J. Dennis Moore; W. James Brady, III; Frederick J. Telecky, Jr.

(57) ABSTRACT

Improved techniques for time domain equalization are disclosed. The improved techniques include (i) improved time domain equalization techniques referred to as poly-path time domain equalization techniques; (ii) improved training methods for training transmitters and/or receivers of a data transmission system; and (iii) techniques for providing time domain equalization to a transmitter side of a data transmission system. These techniques are particularly suitable for time domain equalization in multicarrier modulation systems where channel shortening provided by time domain equalization is particularly needed.

17 Claims, 12 Drawing Sheets

POLY-PATH TIME DOMAIN EQUALIZATION

CROSS-REFERENCE TO RELATED APPLICATION

This application claims the benefit of Provisional Patent Application No. 60/046,244, filed May 12, 1997, which is hereby incorporated by reference.

BACKGROUND OF THE INVENTION

1. Field of the Invention

The present invention relates to data communications, and more particularly, to channel shortening techniques for data communications.

2. Description of the Related Art

Bi-directional digital data transmission systems are presently being developed for high-speed data communication. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Speed Digital Subscriber Lines (VDSL).

The Alliance For Telecommunications Information Solutions (ATIS), which is a group accredited by the ANSI (American National Standard Institute) Standard Group, has finalized a discrete multi tone based approach for the transmission of digital data over ADSL. The standard is intended primarily for transmitting video data and fast Internet access over ordinary telephone lines, although it may be used in a variety of other applications as well. The North American Standard is referred to as the ANSI T1.413 ADSL Standard (hereinafter ADSL standard). Transmission rates under the ADSL standard are intended to facilitate the transmission of information at rates of up to 8 million bits per second (Mbits/s) over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an inverse fast Fourier transform (IFFT), typical values for the number of available sub-channels (tones) are integer powers of two, as for example, 128, 256, 512, 1024 or 2048 sub-channels.

The ADSL standard also defines the use of a reverse signal at a data rate in the range of 16 to 800 Kbit/s. The reverse signal corresponds to transmission in an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancelled systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least 12.98 Mbit/s and up to 51.92 Mbit/s or greater in the downstream direction. To achieve these rates, the transmission distance over twisted-pair phone lines must generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer premise is standard unshielded twisted-pair (UTP) telephone lines.

A number of modulation schemes have been proposed for use in the VDSL and FTTC standards (hereinafter VDSL/FTTC). Most of the proposed VDSL/FTTC modulation schemes utilize frequency division duplexing of the upstream and downstream signals. Another promising proposed VDSL/FTTC modulation scheme uses periodic synchronized upstream and downstream communication periods that do not overlap with one another. That is, the upstream and downstream communication periods for all of the wires that share a binder are synchronized. With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods. For example, with a 20-symbol superframe, two of the DMT symbols in the superframe are silent (i.e., quite period) for the purpose of facilitating the reversal of transmission direction on the phone line. In such a case, reversals in transmission direction will occur at a rate of about 4000 per second. For example, quiet periods of about 10–25 $\mu s$ have been proposed. The synchronized approach can be used a wide variety of modulation schemes, including multi-carrier transmission schemes such as Discrete Multi-Tone modulation (DMT) or Discrete Wavelet Multi-Tone modulation (DWMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation. When the synchronized time division duplexed approach is used with DMT it is referred to as synchronized DMT (SDMT).

Multicarrier modulation has been receiving a large amount of attention due to the high data transmission rates it offers. FIG. 1A is a basic block diagram of a conventional multicarrier transmitter 10. The multicarrier transmitter 10 receives serial input data at a rate $Mf_s$ bit/s. The serial input data is grouped by a serial-to-parallel converter 12 into blocks of M bits at a symbol rate of $f_s$. The M bits are used by modulators 14 to modulate $N_c$ carriers ($m_n$ bits for carrier n) which are spaced $\Delta f_c$ apart across a usable frequency band. The modulated signals are then summed by an adder 16 and transmitted. In a receiver, the received signal is demodulated by each of the $N_c$ carriers, and $m_n$ bits are recovered from each carrier. A more detailed discussion of the principals of multicarrier transmission and reception is provided in J. A. C. Bingham, "Multicarrier Modulation For Data Transmission: An Idea Whose Time Has Come," IEEE Communications Mag., pp. 5–14, May 1990.

FIG. 1B is a block diagram of a conventional multicarrier modulation system 100. The multicarrier modulation system 100 is generally known in the art and discussed in, for example, U.S. Pat. No. 5,285,474, which is hereby incorporated by reference. The multicarrier modulation system 100 has a transmitter side and a receiver side. The transmitter side includes an encoder 102 that receives digital signals to be transmitted. The encoder 102 encodes the digital signals and then passes the encoded signals to a IFFT unit 104 that modulates the encoded signals on multiple carriers. The modulated signals are then converted to analog signals by a digital-to-analog converter 106. The resulting analog signals are then transmitted to a receiver over a channel 108.

The receiver side of the multicarrier modulation system 100 operates to receive the transmitted analog signals from the transmitter side through the channel 108. The received analog signals are converted into digital signals by an analog-to-digital converter 110. The digital signals are then supplied to a time-domain equalizer (TEQ) 112 that compensates for the attenuation and delay on each of the subchannels. The resulting signals are then supplied to a FFT unit 114 that converts the resulting signals from the time domain to the frequency domain. The frequency domain signals are then supplied to a frequency-domain equalizer (FEQ) 116 that compensates for the attenuation and delay of each of the subchannels. In effect, the FFT unit 114 and the FEQ 116 operate to demodulate the digital signals from the multiple carriers. The signals produced by the FEQ 116 are then supplied to a decoder 118 to recover the data signals originally transmitted.

Distortion by the channel 108 causes amplitude and delay variations in the channel responses. These amplitude and delay variations can lead to errors in the recovery of the transmitted data at the receiver. The time domain equalizer (TEQ) 112 provided on the receiver side of the multicarrier modulation system 100 operates to attempt to equalize the amplitude and delay of the channel responses over the frequency band. The operation of the TEQ 112 is computationally complex and not able to perfectly equalize the amplitude and delay of the channel response. Given the computational difficulty in performing time domain equalization, the time domain equalization is typically performed by an adaptive equalization technique such as discussed in U.S. Pat. No. 5,285,474. Adaptive equalization has been somewhat effective but occasionally has difficulty obtaining convergence.

With multicarrier modulation systems that provide upstream and downstream data transfer, a guard period (e.g., cyclic prefix) is typically added to each symbol to increase the length of the sample. In this case, the time domain equalization operates to compress the channel response to the length of the guard period using some sort of adaptive equalization. This channel compression is known as channel shortening. By providing the guard period and utilizing the time domain equalization, the distorted transient response of a channel is largely mitigated and intersymbol and intercarrier interference is substantially reduced. The combination of the guard band and adaptive equalization is needed when the channel response (length) is long. However, the convergence of the adaptive equalization is not fast, accurate or guaranteed when the length of the guard band is small compared to the length of the channel.

Although conventional time domain equalization techniques have reduced channel distortion by shortening the effective length of the channel, in many cases the effective lengths are still too long and too much channel distortion remains present. Although providing a guard band is helpful, the length of the guard band needs to remain relatively small so as to not hinder the efficiency of data transmissions, and thus, time domain equalization techniques are heavily relied on to reduce channel distortion.

Hence, there is a need for more effective techniques to shorten effective channel lengths, particularly in multicarrier modulation systems where distortion is particularly problematic.

SUMMARY OF THE INVENTION

Broadly speaking, the invention relates to time domain equalization. More particularly, the invention relates to the following aspects (i) improved time domain equalization techniques referred to as poly-path time domain equalization techniques; (ii) improved training methods for training transmitters and/or receivers of a data transmission system; and (iii) a data transmission system in which a transmitter side provides time domain equalization. These aspects are particularly suitable for time domain equalization in multicarrier modulation systems where channel shortening provided by time domain equalization is particularly needed.

The invention can be implemented in numerous ways, including as an apparatus, system, method, or computer readable media. Several embodiments of the invention are discussed below.

As an apparatus for recovering data transmitted by a transmitter of a DMT transmission system, one embodiment of the invention includes: an analog-to-digital converter to receive transmitted analog signals and produce digital signals therefrom, the transmitted analog signals being time domain signals representing data transmitted; a poly-path time domain equalizer to provide a plurality of paths for the received digital signals and perform time domain equalization on the received digital signals on both of the paths to produce equalized digital signals; a multicarrier demodulator to receive the equalized digital signals and demodulate the equalized digital signals to produce digital frequency domain data; and a decoder to decode the digital frequency domain data to recover the data transmitted.

As a method for shortening an effective channel length of an actual channel in a DMT data transmission system, an embodiment of the invention includes the operations of: receiving analog signals transmitted over the actual channel using DMT modulation; converting the received analog signals to digital signals; forming a plurality of effective channels from the received analog signals; providing a FIR filter for each of the effective channels; determining filter taps for each of the FIR filters such that an overall effective channel length is shortened; and shortening the overall effective channel length using the FIR filters associated therewith and using a different set of the determined filter taps for each of the FIR filters.

As a method for shortening an effective channel length of an actual channel prior to data transmission over the actual channel in a multicarrier-based data transmission system, an embodiment of the invention includes the operations of: receiving digital signals to be transmitted over the actual channel; forming a plurality of effective channels from the received digital signals; providing a FIR filter for each of the effective channels; determining filter taps for each of the FIR filters such that an overall effective channel length is shortened; and shortening the overall effective channel length using the FIR filters associated therewith and using a different set of the determined filter taps for each of the FIR filters.

As remote receiver apparatus for a data transmission system, an embodiment of the invention includes a transmitter side, a receiver side, and a hybrid circuit operatively connecting the transmitter side and the receiver side to a channel. The transmitter side includes at least an encoder, a multicarrier modulator, a time domain equalizer, and a digital-to-analog converter. The encoder operates to encode data to be transmitted from the remote receiver apparatus. The multicarrier modulator operates to modulate the encoded data to produce modulated signals. The time domain equalizer operates to performs time domain equalization on the modulated signals to produce equalized digital signals. The digital-to-analog converter receives the equalized digital signals and produces analog signals to be transmitted therefrom. The receiver side including at least an analog-to-digital converter, a time domain equalizer, a multicarrier demodulator, and a decoder. The analog-to-digital converter receives analog signals associated with data that has been transmitted and produces digital signals therefrom. The time domain equalizer performs time domain equalization on the received digital signals to produce equalized digital signals. The multicarrier demodulator receives the equalized digital signals and demodulates the equalized digital signals to produce demodulated data. The decoder operates to decode the demodulated data to recover the data transmitted.

As a transmitter for a multicarrier-based data transmission system, an embodiment of the invention includes: an encoder to encode data to be transmitted by the transmitter; a multicarrier modulator to modulate the encoded data to produce modulated signals; a time domain equalizer to performs time domain equalization on the modulated signals to produce equalized digital signals; and a digital-to-analog converter to receive the equalized digital signals and produce analog signals to be transmitted therefrom.

As computer readable media, embodiments of the invention would include computer readable program code for performing the operations of the methods according to the invention.

The various aspects of invention have numerous advantageous. One advantage of the invention is improved compensation for channel distortion (or improved channel shortening), which means a better signal-to-noise ratio for the data transmissions. Another advantage is more accurate determinations of filter taps utilized in Finite Impulse Response (FIR) filters. Still another advantage of the invention is the ability to train a chosen target channel. Yet another advantage is more accurate modeling of channels. Still yet another advantage is the ability to better manage power consumption at a central transmission site.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to time domain equalization. More particularly, the invention relates to the following aspects (i) improved time domain equalization techniques known as poly-path time domain equalization techniques; (ii) improved training methods for training transmitters and/or receiver of a data transmission system; and (iii) a data transmission system in which a transmitter side provides time domain equalization. Each of these aspects are described in detail below.

Embodiments of the invention are discussed below with reference to FIGS. 2–11. However, those skilled in the art will readily appreciate that the detailed description given herein with respect to these figures is for explanatory purposes as the invention extends beyond these limited embodiments.

Poly-Path Time Domain Equalization

The poly-path time domain equalization techniques are performed by a time domain equalizer (TEQ) in a receiver side or transmitter side of a multicarrier modulation system where substantial channel shortening is needed to mitigate channel distortion. The time domain equalizer (TEQ) is realized as a tapped delay line via a Finite Impulse Response (FIR) filter that maximizes the ratio of energy inside the range of a channel impulse response to the energy outside the range of the channel impulse response. According to the invention, the time domain equalizer (TEQ) has multiple paths (i.e., parallel FIR filters) so that both convergence and effectiveness of the time domain equalizer (TEQ) are improved. The poly-path time domain equalization techniques according to the invention are particularly suitable for time domain equalization in multicarrier modulation systems where substantial channel shortening is needed.

Figure 1A:
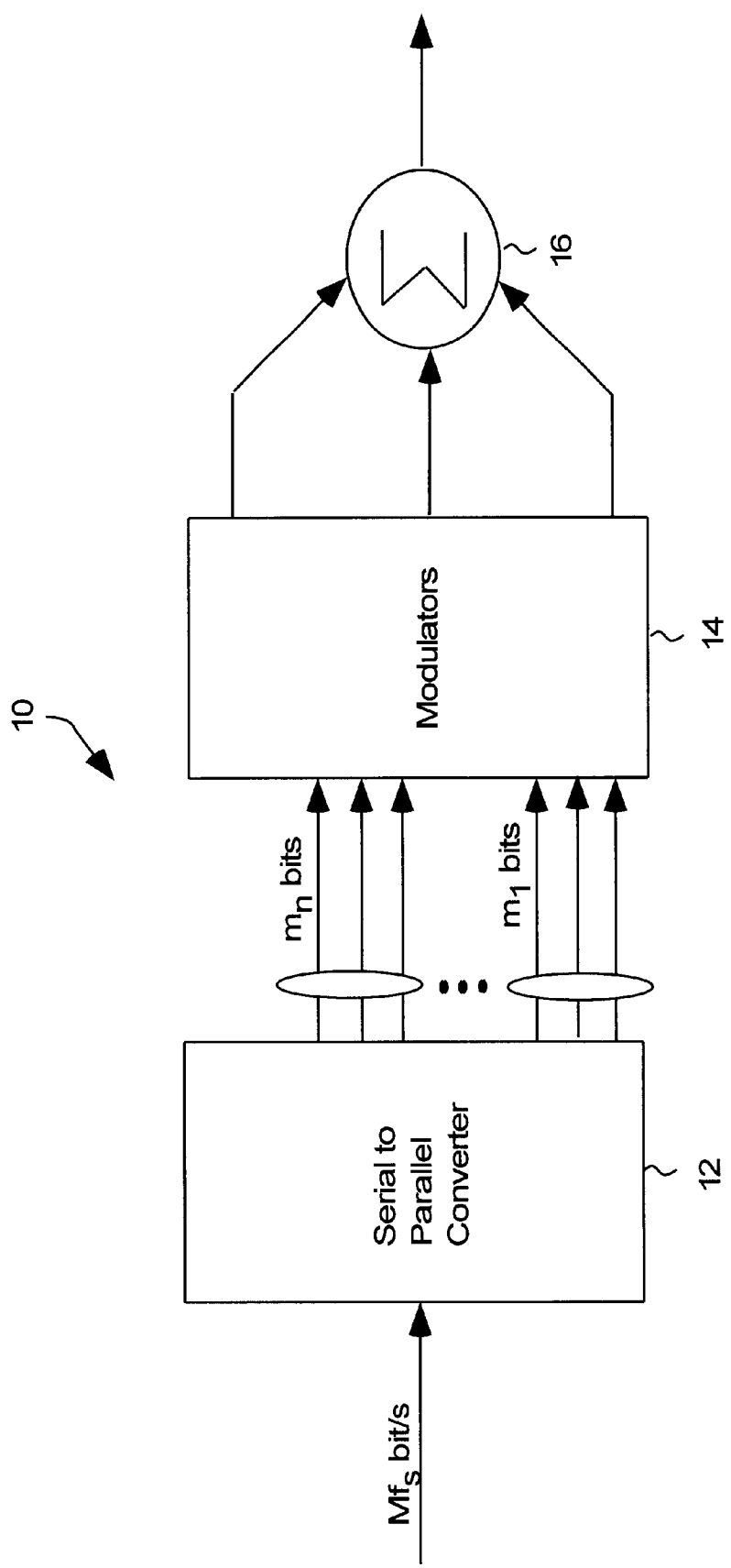
FIG. 1A is a basic block diagram of a conventional multicarrier transmitter.
Figure 1B:
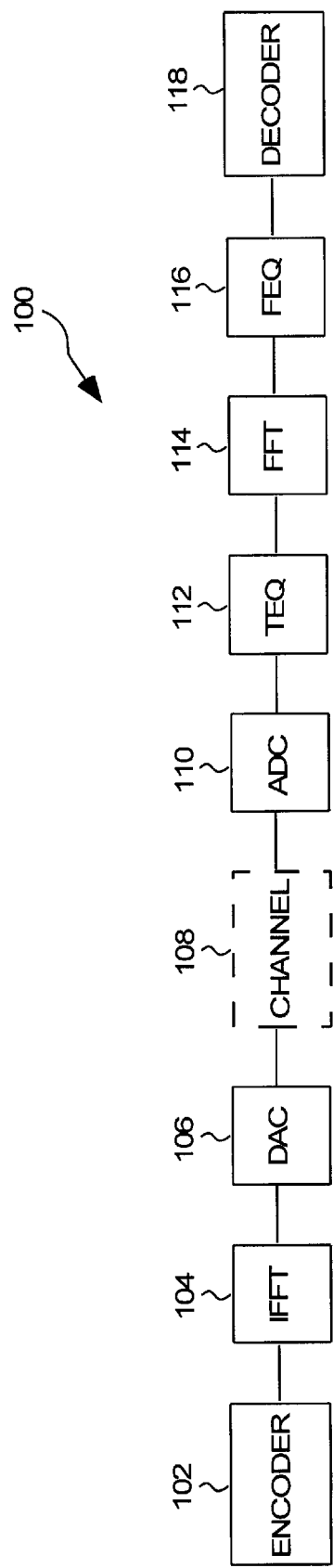
FIG. 1B is a block diagram of a conventional multicarrier modulation system.

Conventional approaches to time domain equalization utilize at a receiver side only a single path through the time domain equalizer and often have difficulty obtaining convergence. FIG. 1B illustrates the TEQ unit 112 at the receiver side of the multicarrier modulation system 100. The TEQ unit 112 is a single path time domain equalizer.

In a multicarrier modulation system using a guard band, the effective length of the overall channel must be less than or equal to v+1, where v is the length of the guard band. The task then of the time domain equalizer (TEQ) is to shorten the effective length of the overall channel such that it is less than or equal to v+1. This requirement is expressed by the following equation:

$$Lh_{overall}(D)=L[h(D)W(D)] \leq v+1$$

where L represents length, h(D) is a transfer function of the channel and W(D) is a transfer function of the time domain equalizer (TEQ), the effective channel has a transfer function $h_{overall}(D)$ and a length less than or equal to v+1.

According to the invention, the time domain equalizer (TEQ) is provided with a plurality of paths, and thus effective channels, so that the transfer function $h_{overall}(D)$ becomes more sophisticated and thus able to provide significantly more channel shortening. For example, in the case where the effective channel has two paths (i.e., two channels A and B), the overall transfer function is as follows:

$$Lh_{overall}(D)=L[h_A(D)W_A(D)+h_B(D)W_B(D)] \leq v+1$$

Since a plurality of paths are provided through a time-domain equalizer, the receiver effectively receives the transmitted data over a plurality of channels. Each channel is modeled as a tapped delay line which is implemented as a finite impulse response (FIR) filter. Each of the channels undergoes time domain equalization so as to shorten the overall channel length. The time domain equalizer (TEQ) for each of the channels is provided by a FIR filter whose filter taps (coefficients) are determined in dependence on one another.

Figure 2:
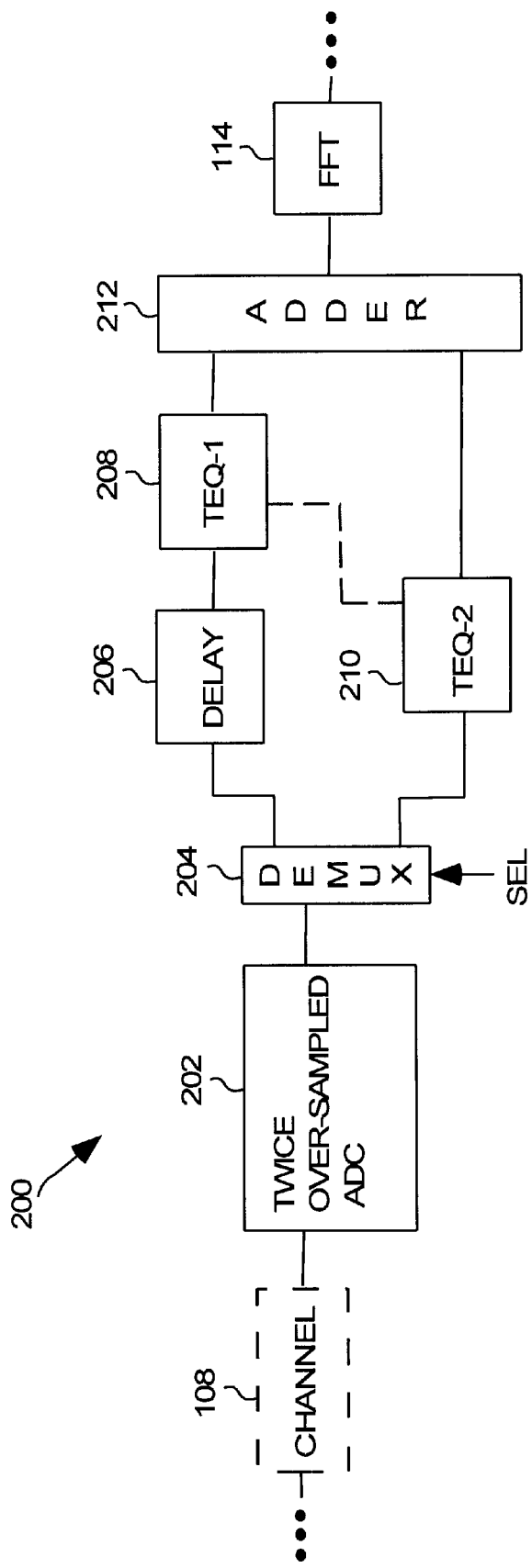
FIG. 2 is a block diagram of a portion of a receiver of a multicarrier modulation system according to one embodiment of the invention.
Figure 3:
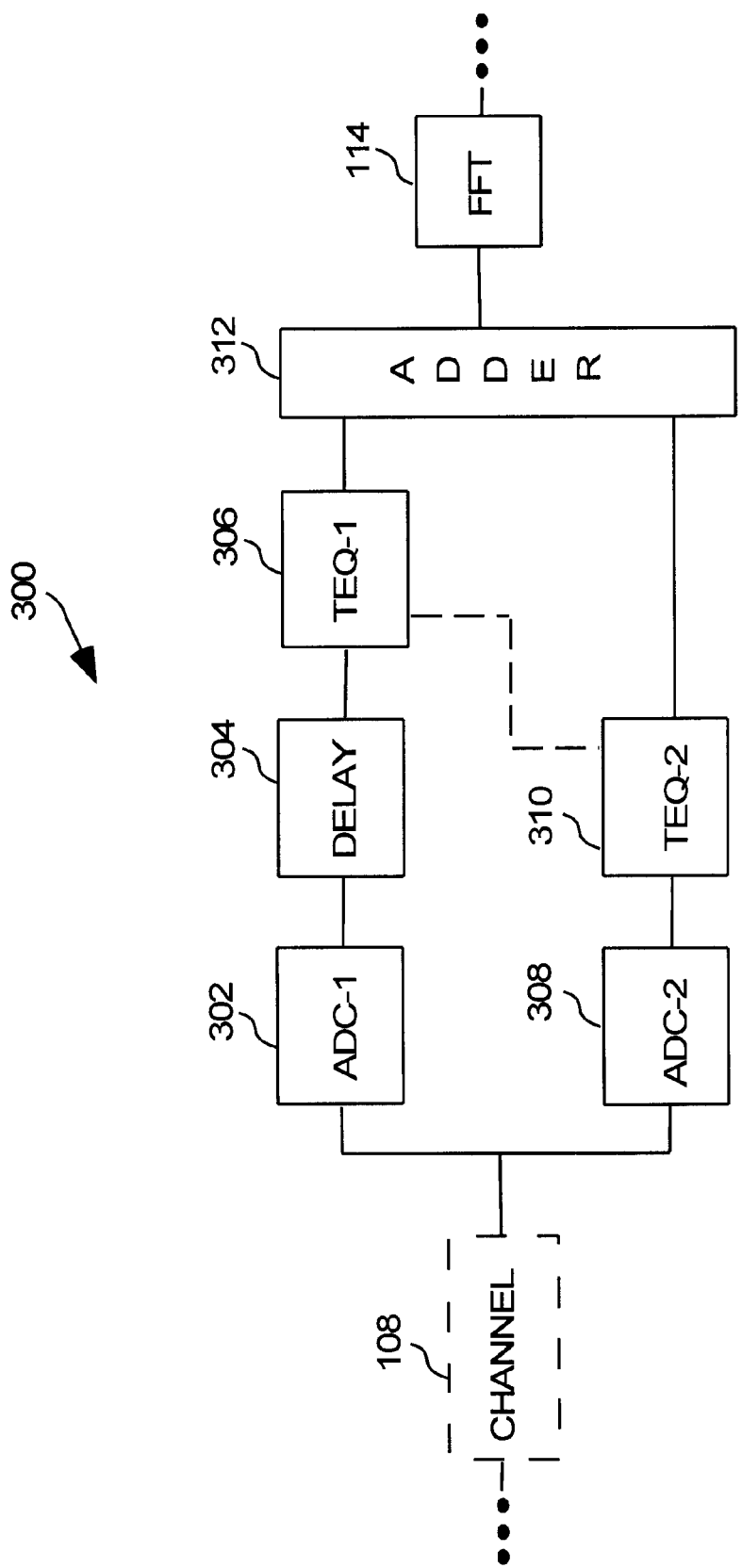
FIG. 3 is a block diagram of a portion of a receiver according to another embodiment of the invention.
Figure 4:
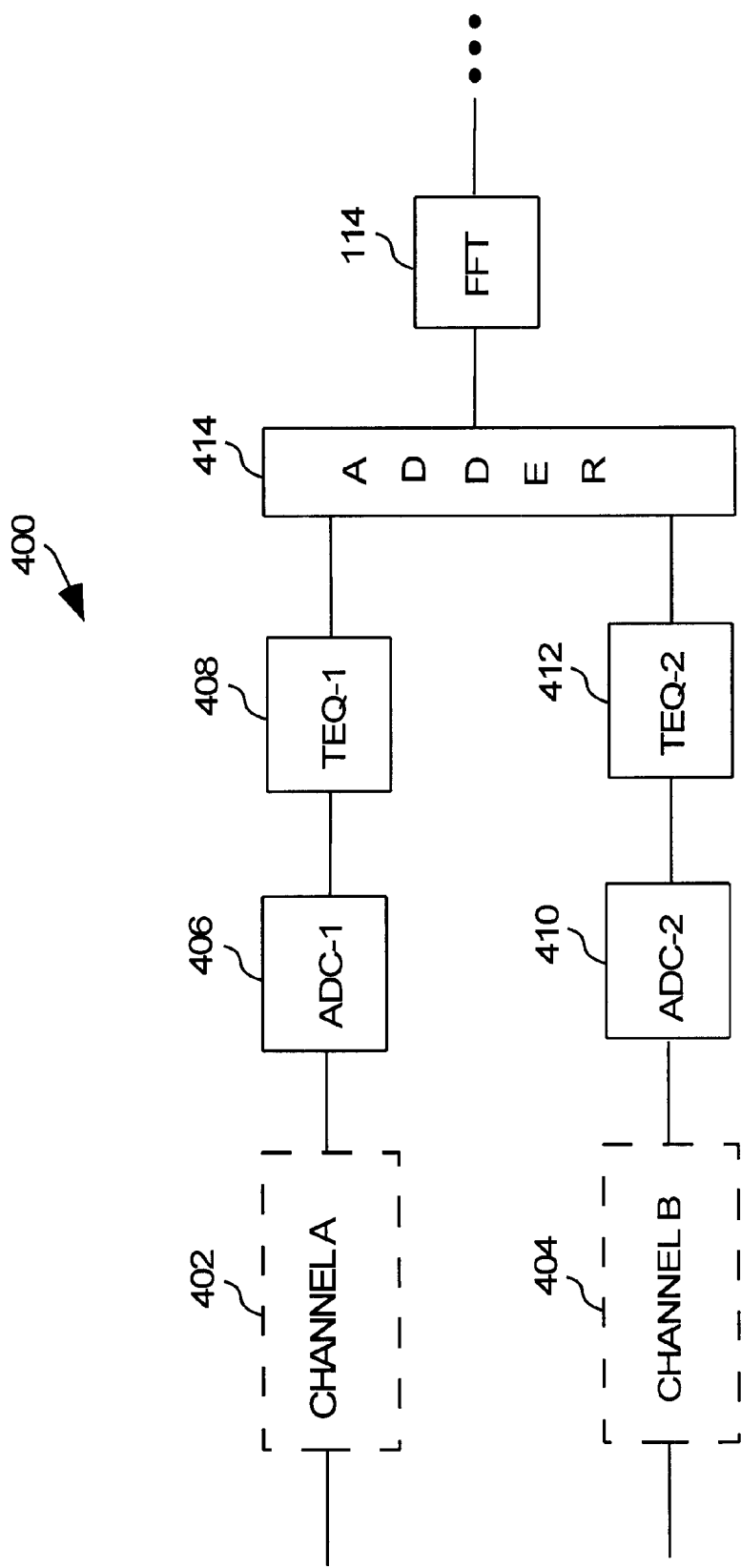
FIG. 4 is a block diagram of a portion of a receiver according to still another embodiment of the invention.

According to the invention, a transmitter operates to transmit data over a channel to a receiver. The channel is an actual channel that has distortion associated therewith. At a receiver, the transmitted data is received or at least partially processed on a plurality of channels, real or effective. Forming the plurality of channels in a receiver of a multi-carrier modulation system can be performed in a number of ways. FIGS. 2–4 illustrate three different ways in which two channels can be formed in a multicarrier modulation system that has actually transmits only over a single actual channel 108.

FIG. 2 is a block diagram of a portion of a receiver 200 of a multicarrier modulation system according to one embodiment of the invention. The receiver 200 receives analog signals transmitted over the channel 108 and supplies them to a twice-oversampled analog-to-digital converter (ADC) 202. The twice-oversampled ADC 202 operates to oversample the incoming analog signals by a factor of two. Hence, if the analog signals are input to the twice-oversampled ADC 202 at a rate R, then the digital signals are output at a rate of 2R from the twice-oversampled ADC 202. The digital signals output by the twice-oversampled ADC 202 are supplied to a demultiplexer 204. Under the control of a select signal (SEL), the demultiplexer 204 forwards alternative ones of the digital signals to either a first effective channel or a second effective channel. The first effective channel includes a delay element 206 and a first time-domain equalizer (TEQ-1) 208. The second effective channel includes a second time-domain equalizer (TEQ-2) 210. The delay element 206 compensates for the delay induced on the second effective channel by the demultiplexer 204. An adder 212 then combines respective equalized signals from the first and the second time-domain equalizers (TEQ-1 and TEQ-2) 208 and 210. The combined signals are then supplied to the FFT unit 114 and subsequent portions of the receiver 200 such as illustrated in FIG. 1B.

FIG. 3 is a block diagram of a portion of a receiver 300 according to another embodiment of the invention. The receiver 300 receives analog signals over the channel 108. The received analog signals are supplied to first and second effective channels. The first effective channel includes a first analog-to-digital converter (ADC-1) 302, a delay unit 304, and a first time-domain equalizer (TEQ-1) 306. The second effective channel includes a second analog-to-digital converter (ADC-2) 308 and a second time-domain equalizer (TEQ-2) 310. The first analog-to-digital converter (ADC-1) 302 and the second analog-to-digital converter (ADC-2) 308 sample the received analog signals at different phases so that the first and second effective channels are formed. The delay unit 304 thereafter delays the first channel by the amount of the phase offset so that the respective sampled values of the first and second channels are back in phase. The equalized signals produced by the first time-domain equalizer (TEQ-1) 306 and the second time-domain equalizer (TEQ-2) 310 are combined by an adder 312. The combined signals are supplied to the FFT 114 and subsequent portions of the receiver 200 such as illustrated in FIG. 1B.

FIG. 4 is a block diagram of a portion of a receiver 400 according to still another embodiment of the invention. The receiver 400 includes first and second channels like the embodiments illustrated in FIGS. 2 and 3, but produces the first and second channels using two different antennae positioned at different locations near or approximate to the receiver 400. The placement of the antenna in different locations at the receiver 400 causes the formation of the first and second channels. Hence, in this embodiment of the invention, there are two actual channels: channel A 402 and channel B 404. The analog signals received over the channel A 402 are supplied to a first analog-to-digital converter (ADC-1) 406. The input analog signals are converted into digital signals by the first analog-to-digital converter (ADC-1) 406. The resulting digital signals are then supplied to a first time-domain equalizer (TEQ-1) 408. The input signals received at the channel B 404 are supplied to a second analog-to-digital converter (ADC-2) 410. The second analog-to-digital converter (ADC-2) 410 converts the incoming analog signals to digital signals. The resulting digital signals are supplied to a time-domain equalizer (TEQ-2) 412. An adder 414 of the receiver 400 operates to add or sum the equalized signals supplied by the first and the second equalized time-domain equalizers (TEQ-1, TEQ-2) 408 and 412. The combined signals produced by the adder 414 are then supplied to the FFT 114 and subsequent portions of the receiver 200 such as illustrated in FIG. 1B.

In this embodiment, the poly-path time domain equalizer requires two or more paths or channels (effective or real) which are modeled as FIR filters having predetermined number of taps. Also, the time domain equalizers (TEQs) used to compensate for distortion on each of the channels are implemented as FIR filters having a predetermined number of taps. The filter taps for the time domain equalizers (TEQs) are determined dependent on one another such that the effective length of the overall channel appears substantially shortened. The determination of the filter taps for the channel models and the time domain equalizer (TEQ) for each of the paths of the poly-path time domain equalizer is explained below.

Figure 5:
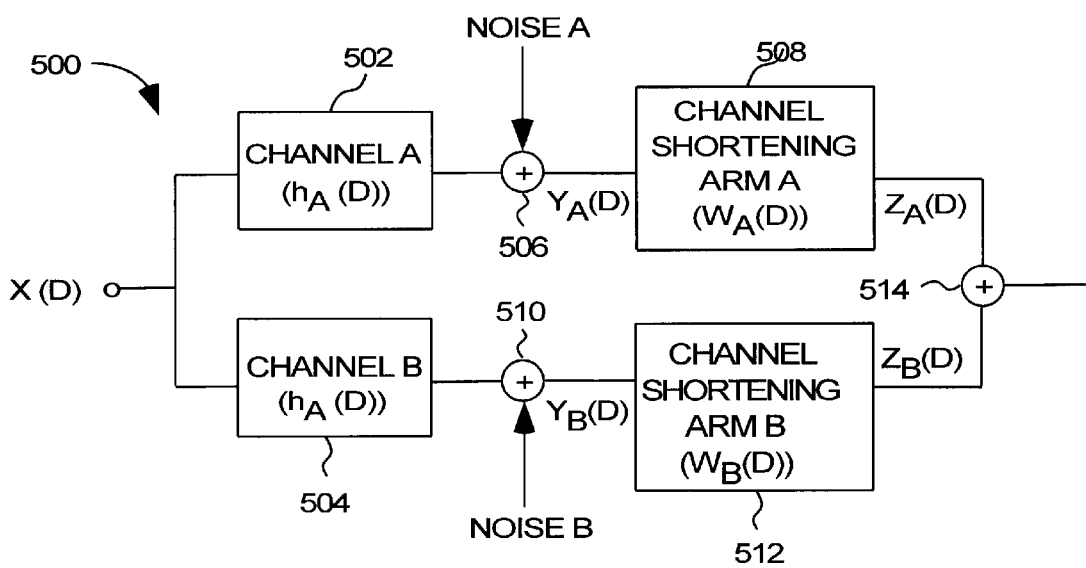
FIG. 5 is a block diagram of a model for a two-path time domain equalizer according to the invention.

FIG. 5 is a block diagram of a model 500 for a two-path time domain equalizer according to the invention. According to the model 500, transmitted signals are effectively transmitted over first and second channels, channel A 502 and channel B 504. The channel A 502 is modeled as a FIR filter ($h_A(D)$) and the channel B 504 is modeled as a FIR filter ($h_B(D)$). The channel A 502 has associated with it distortion or noise. The noise or distortion associated with channel A 502 is represented by Noise A which is summed at an adder 506 with the signals received from the reception side of the channel A 502. The results from the adder 506 are effective channel signals $Y_A(D)$ and represent the signals that a receiver would receive. The effective channel signals then undergo a channel shortening by a channel shortening arm A 508 to produce a shortened channel FIR response $Z_A(D)$. The channel shortening arm A 508 has a transfer function $W_A(D)$ and is preferably implemented as a FIR filter. The received signals from the channel B 504 also are subjected to noise or distortion. The noise or distortion is modeled as Noise B which is summed at an adder 510 with the signals received from the reception side of the channel B 504. The results from the adder 510 are effective channel signals $Y_B(D)$ and represent the signals that a receiver would receive. The effective channel signals then undergo a channel shortening by a channel shortening arm B 512 to produce a shortened channel FIR response $Z_B(D)$. The channel shortening arm B 512 has a transfer function $W_B(D)$ and is preferably implemented as a FIR filter. The shortened channels for the channel A ($Z_A(D)$ and $Z_B(D)$) are then added by an adder 514 to produce the equalized signals.

In general, the overall length of the channel after the TEQ processing is equal to a delayed version of a target channel b(D) plus a residue (r). More particularly, the overall length of the channel is determined according to the following equation (1):

$$h_A(D)W_A(D)+h_B(D)W_B(D)=D^{-d}b(D)+r(D) \quad (1)$$

where $D^{-d}$ represents a delay of d.

The taps for the FIR filters of the channel A ($h_A(D)$) and the channel B ($h_B(D)$) are preferably determined by a training process that uses adaptive techniques or channel identification techniques. The taps for the transfer functions $W_A(D)$ and $W_B(D)$ are adaptively determined to obtain the desired target channel b(D) with minimal amounts of residue r(D). Preferably, the taps for the transfer functions $W_A(D)$ and $W_B(D)$ are adaptively determined by the following equation (2):

$$[h] \cdot [W] = [b] + [r] \quad (2)$$

where [h] is a matrix as follows:

$$\begin{bmatrix} h_A(0) & 0 & 0 & \cdots & \cdots & 0 & h_B(0) & 0 & 0 & \cdots & \cdots & 0 \\ h_A(1) & h_A(0) & & & & \vdots & h_B(1) & h_B(0) & & & & \vdots \\ h_A(2) & h_A(1) & h_A(0) & & \ddots & \vdots & h_B(2) & h_B(1) & h_B(0) & & \ddots & \vdots \\ h_A(3) & h_A(2) & h_A(1) & \ddots & & 0 & h_B(3) & h_B(2) & h_B(1) & \ddots & & 0 \\ \vdots & \ddots & \ddots & \ddots & \ddots & h_A(0) & \vdots & \ddots & \ddots & \ddots & \ddots & h_B(0) \\ h_A(M-1) & & & \ddots & \ddots & h_A(1) & h_B(M-1) & & & \ddots & \ddots & h_B(1) \\ 0 & \ddots & & \ddots & \ddots & h_A(2) & 0 & \ddots & & \ddots & \ddots & h_B(2) \\ \vdots & & & & \ddots & h_A(3) & \vdots & & & & \ddots & h_B(3) \\ \vdots & & \ddots & & & \vdots & \vdots & & & \ddots & & \vdots \\ 0 & \cdots & \cdots & \cdots & 0 & h_A(M-1) & 0 & \cdots & \cdots & \cdots & 0 & h_B(M-1) \end{bmatrix}$$

where [W] is a matrix as follows:

$$\begin{bmatrix} W_A(0) \\ \vdots \\ x \\ \vdots \\ W_A(L-1) \\ W_B(0) \\ \vdots \\ W_B(L-1) \end{bmatrix}$$

where [b] is a matrix and [r] is a matrix which are respectively as follows:

$$\begin{bmatrix} 0 \\ \vdots \\ 0 \\ b_0 \\ b_1 \\ \vdots \\ b_v \\ 0 \\ \vdots \\ 0 \end{bmatrix} \begin{bmatrix} x \\ \vdots \\ x \\ 0 \\ 0 \\ \vdots \\ 0 \\ x \\ \vdots \\ x \end{bmatrix}$$

where M is the length of the channels $h_A(D)$ and $h_B(D)$ and L is the length of the transfer functions $W_A(D)$ and $W_B(D)$. The amount of delay (d) is the depth of term $b_0$ in the matrix [b] (i.e., the number of zeros from the top down to just before $b_0$), and where the delay (d) and the values (and sign) of b can vary.

In Equation (1), according to the invention, the residue r(D) can be theoretically reduced to zero if $2L \geq M+L-1$, provided $h_A(D)$ and $h_B(D)$ do not share more than v roots. More generally, for any number of paths (P), the residue r(D) can be reduced to zero if $P \cdot L \geq M+L-1$, provided all the $h_A(D), \ldots, h_B(D)$ for the various paths do not share more than v roots. Consequently, for FIR modeled channels, channel distortion can be theoretically completely eliminated using a FIR filter bank as a poly-path TEQ of an appropriate length. The appropriate length (or number of filter taps needed) for the FIR filter bank is $P \cdot L$.

For example, upstream transmissions in an ADSL system where the length of the channels (M) equals 64, the number of taps per channel and total number of taps could be as indicated in Table 1 which follows.

TABLE 1

| # of Paths | # Taps per Path | Total # of Taps |
|---|---|---|
| 2 | 63 | 126 |
| 3 | 32 | 96 |
| 4 | 21 | 84 |

Although the total number of taps increases with poly-path TEQ techniques, the processing burden or MIPS requirement of such a FIR filter bank is not high because the computations need only be determined in accordance with a slowed sampling rate.

Further, according to the invention, any target channel b(D) can be obtained from the poly-path TEQ, provided no roots are being shared. Hence, with two paths, v=4 and no roots being shared by $h_A(D)$ and $h_B(D)$ for the two paths, the target channel d(D) is a polynomial having four (4) degrees of freedom. If some roots are shared, then the target channel b(D) is still able to be flexibly chosen but the roots being shared must be in the target channel b(D) and the number of roots being shared must be less than v. For example, with v=4 and two (2) roots ($\alpha$, $\beta$) being shared by $h_A(D)$ and $h_B(D)$ for two paths, the target channel b(D) has two (2) degrees of freedom and can be expressed as b(D)=[(D-$\alpha$)(D-$\beta$)]$b_2$(D).

Although the above discussion models the channel with FIR filters (i.e., as tapped delay lines), the same results can be achieved with Infinite Impulse Response (IIR) modeled channels. IIR channels can be modeled as a ratio of two polynomials. Using IIR channels to model actual channels may be advantageous where the channel impulse response is long. In particular, with a FIR modeled channel, the number of filter taps scale with the length (L) of the TEQ transfer functions, namely P•L, though as P increases L decreases as illustrated in Table 1. Even so, with long channels the amount of hardware needed to model the channel may be burdensome. By modeling the channel as an IIR channel less filter taps tend to be required. As shown below, the poly-path time domain equalization according to the invention is likewise applicable to IIR modeled channels.

Consider two paths $h_A(W)$ and $h_B(W)$ for the poly-path TEQ. Each of these paths is a IIR that is modeled as a ratio of two polynomials that are themselves modeled as FIR filters. Specifically, assume the following:

$$h_A(W)=\alpha(z)/\beta(z) h_B(W)=\gamma(z)/\delta(z)$$

It turns out that Equation (1) for the FIR situation generalizes to the IIR situation and is as follows in Equation (3):

$$h_A(D)[\beta(D)\theta(D)]+h_B(D)[\delta(D)\psi(D)]=D^{-d}b(D)+r(D) \quad (3)$$

where $\theta$(D) is the TEQ filter for the effective (FIR) channel $h_A(D)\beta(D)$ and $\psi$(D) is the TEQ filter for the effective (FIR) channel $h_B(D)\delta(D)$. The polynomials $\beta$(D) and $\delta$(D) are associated with the two paths (channels) and can be determined in a number of ways which are generally referred to as deterministic and stochastic realization and model order reduction. For example, in a 1982 masters thesis of Debajyoti Pal, entitled "Balanced Stochastic Realizations and Model Reduction," from Washington State University, which is hereby incorporated by reference, suitable techniques were disclosed for separately determining the polynomials such as $\beta$(D) and $\delta$(D). Also, techniques associated with documents referenced in this masters thesis may also be used. Additionally, techniques to determine the polynomials such as $\beta$(D) and $\delta$(D) are also found in the following papers which are hereby incorporated by reference: Desai and Pal, "A Realization Approach to Stochastic Model Reduction and Balanced Stochastic Realizations," IEEE Conf. on Decision & Control, 1982; Desai and Pal, "A Transformation Approach to Stochastic Model Reduction," IEEE Transactions on Automatic Control, Vol. AC-29, No. 12, December 1984; and Desai, Pal and Kirkpatrick, "A realization approach to stochastic model reduction," Int. J. Control, Vol. 42, No. 4, 1985, pp. 821–838.

Figure 6:
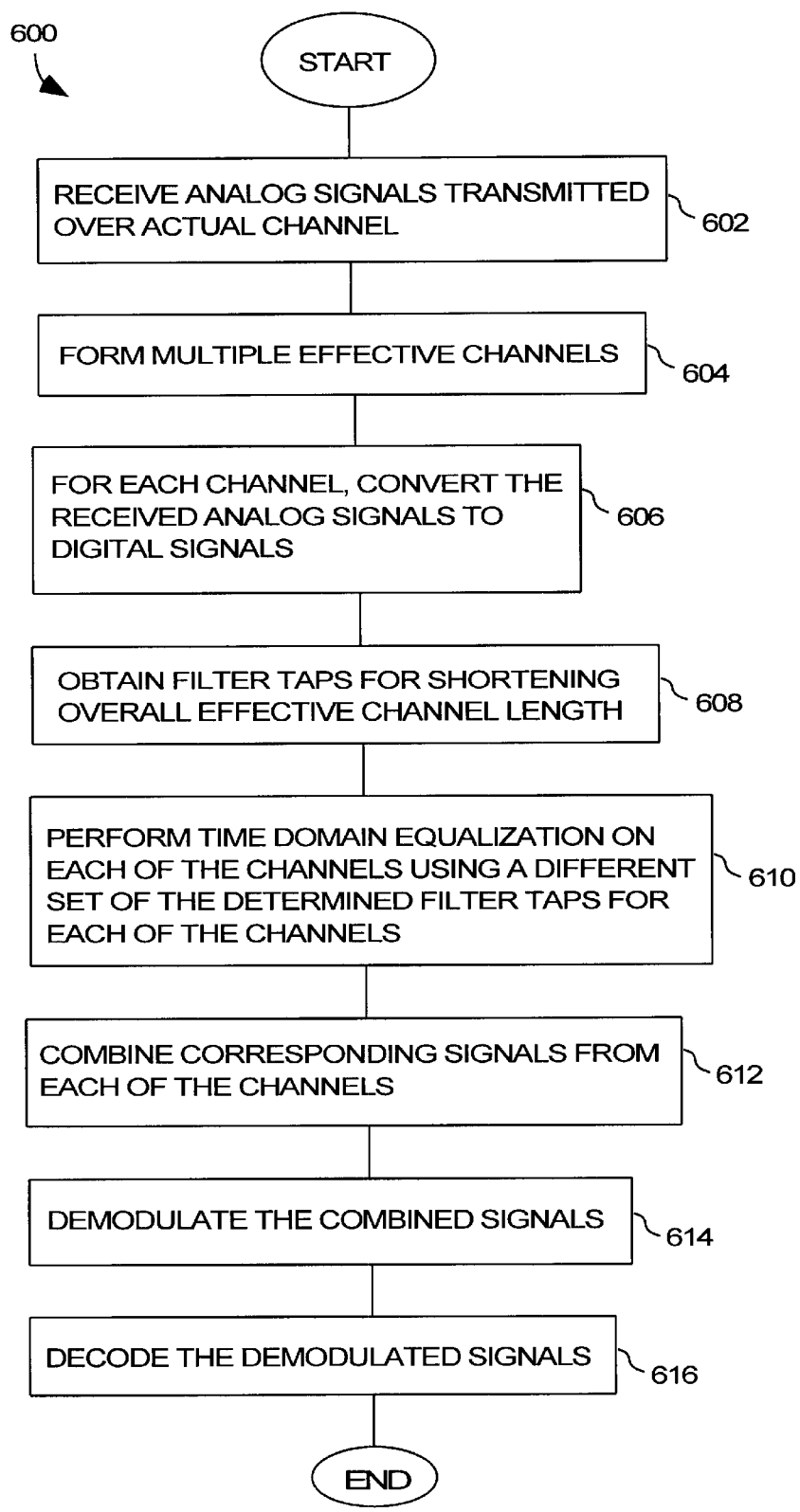
FIG. 6 is a flow diagram of poly-path time domain equalization processing according to an embodiment of the invention.

FIG. 6 is a flow diagram of poly-path TEQ processing 600 according to an embodiment of the invention. The poly-path TEQ processing 600 is preferably associated with the receiver 300 illustrated in FIG. 3.

The poly-path TEQ processing 600 initially receives 602 analog signals that have been transmitted over an actual channel. Using the received analog signals, the poly-path TEQ processing 600 forms 604 multiple effective channels. For example, two channels were formed in the receiver 300 illustrated in FIG. 3. Then, for each channel, the received analog signals that are supplied to that channel are converted 606 to digital signals. In FIG. 3, the conversion to digital signals for the first and second channels are performed by the first analog-to-digital converter (ADC-1) 302 and the second analog-to-digital converter (ADC-2) 308. However, it should be noted that the operations 604 and 606 can be performed in reverse order or concurrently.

The poly-path TEQ processing 600 in general operates to effectively shorten the channel length by using transfer functions, namely, a FIR filter within the time-domain equalizer (i.e., TEQ-1 and TEQ-2) for each of the respective channels. Hence, the poly-path TEQ processing 600 obtains 608 the filter tabs for the respective FIR filters so as to shorten the overall effective channel length. The filter taps for the FIR filters are normally previously determined during a training state and stored to temporary memory for subsequent use. The filter taps for each of the FIR filters implementing the individual time domain equalizers (TEQs) are all determined in dependence on one another. As an example, Equation (2) above is suitable for determining the filter taps for the FIR filters. Training operations for determining filter taps for the FIR filters are discussed in detail below.

Once the filter taps have been obtained 608, time-domain equalization can be performed 610 on each of the channels using a different set of the determined filter taps. The resulting equalized signals from each of the channels are then combined 612. The combined signals then demodulated 614. For example, in FIG. 3, the demodulation is performed by the FFT unit 114. The demodulated signals can then be decoded 616 and thereafter processed by the receiver. Following block 616, the poly-path TEQ processing 600 is complete and ends.

One advantage of the invention is that the target channel b(D) is able to be chosen. Typically, the target channel b(D) is predetermined to a single or a limited set of values that represent channels having the channel characteristics desired. For example, for an upstream ADSL channel b(D) within a window could be [1, 0, −2, 0, 1] or [1, −2, 0, 2, −1].

After choosing the target channel b(D) and the initial delay (d), the filter taps remain to be determined. The determining of the appropriate filter taps is done during training of the transmitter and receiver. Two different approaches for training are explained below.

Improved Training Methods

In general, a training process operates to train transmitters and receivers to understand conditions under which transmission and reception will occur. One approach to training uses a channel identification technique referred to as tone by tone frequency domain FIR channel identification.

Figure 7A:
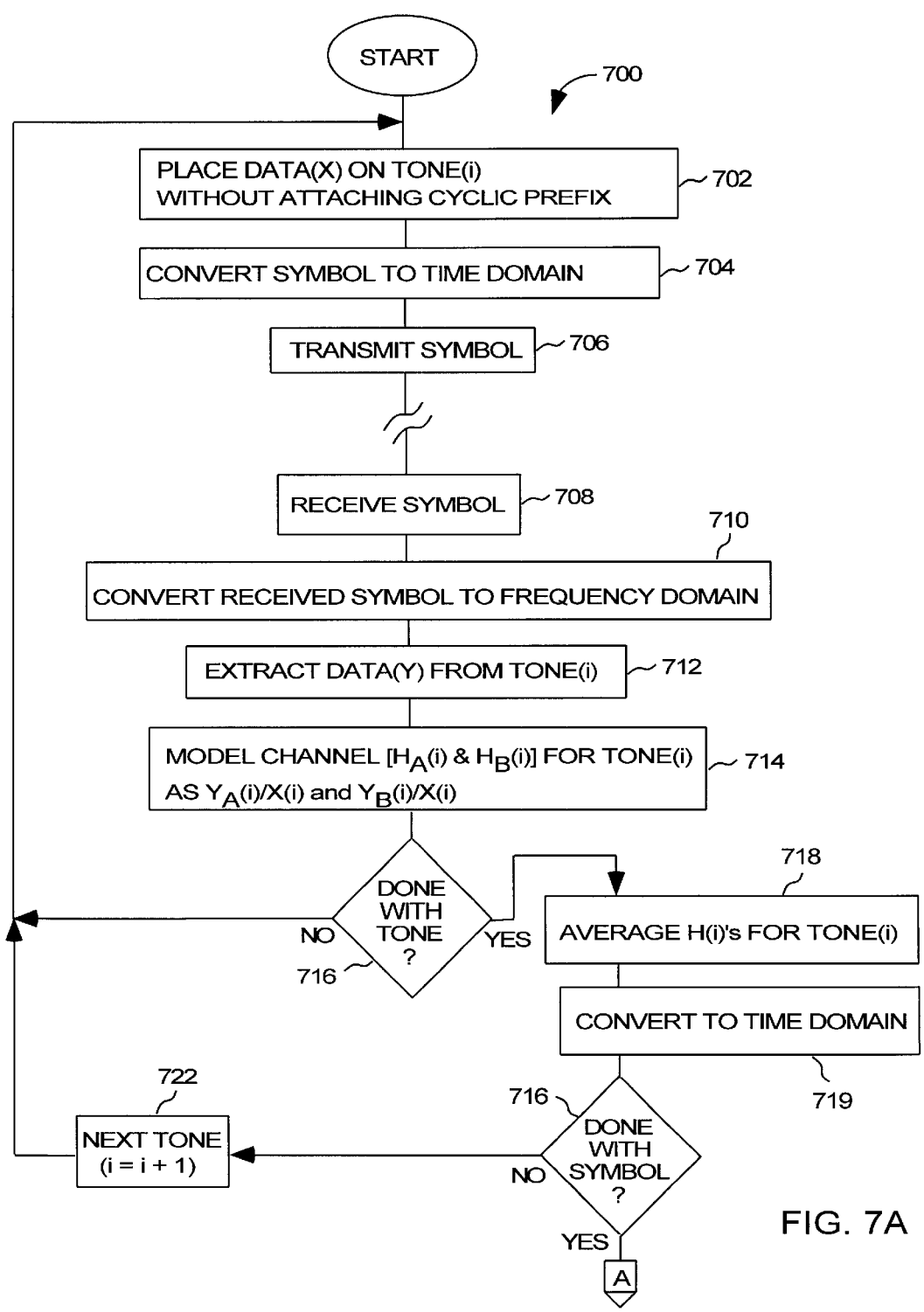
FIGS. 7A and 7B are flow diagrams of a training process according to a first embodiment of the invention.
Figure 7B:
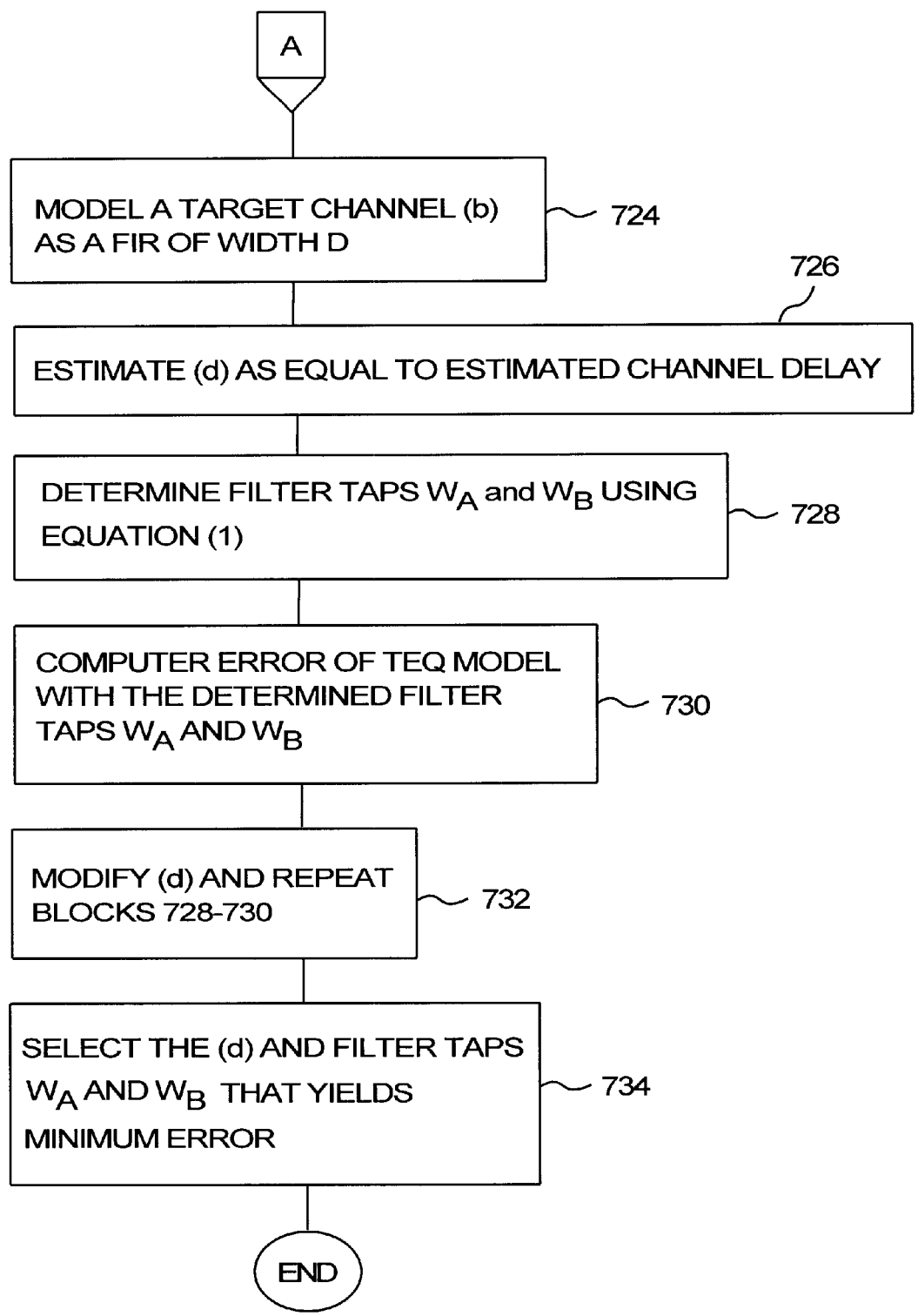

FIGS. 7A and 7B are flow diagrams of a training process 700 according to a first embodiment of the invention. The training process 700 operates to model the channels by performing a tone by tone frequency domain FIR channel identification, and then determining a delay (d) and filter taps $W_A$ and $W_B$.

The training process 700 initially places 702 data (X) on tone (i) without adding or attaching a guard band thereto. For example, in the case of DMT symbols with a plurality of tones, the data (X) is placed on one of the tones while a zero (0) is placed on all other tones. Next, the symbol is converted 704 from the frequency domain to the time domain. Then, the symbol is transmitted 706 to a remote receiver.

Subsequently, the remote receiver receives 708 a symbol that has been transmitted. The received symbol is, however, not identical to the transmitted symbol due to noise and other interference present in the channel over which the symbol was transmitted. Once the received symbol is received, the received symbol is converted 710 to frequency domain data. Then, data (Y) is extracted 712 from the tone (i) of the frequency domain data. In other words, after the symbol is converted to the frequency domain, the data (Y) is read from the tone (i) on which the data (X) was transmitted. Next, the effective channels $H_A(i)$ and $H_B(i)$ for tone (i) are modeled 714 as $Y_A(i)/X(i)$ & $Y_B(i)/X(i)$, respectively.

Next, a decision block 716 determines whether the training process 700 is done with the particular tone being processed. If the training process 700 is not done with the tone, the processing returns to repeat block 702 and subsequent blocks. This permits the training process 700 to obtain several models for each tone of the channel model. However, once the training process 700 is done with the tone, then the final channel model for the particular tone is obtained by averaging 718 over the number of model channels that have been obtained for that tone. After the averaging 718, the final channel for the tone is then converted 719 to the time domain.

A decision block 720 then determines whether the training process 700 is done with the symbol. When the decision block 720 determines that the training process 700 is not done with the symbol, then the next tone is selected 722 by incrementing the index of tones by one. Following the selection of the next tone 722, the training process 700 returns to repeat block 702 and subsequent blocks. On the other hand, once the decision block 720 determines that the training process 700 is done with this symbol, then a target channel (b) is modeled 724 as a FIR filter of length v. Then, a delay value (d) is estimated 726 as being equal to an estimated channel delay. Next, the filter taps $W_A$ and $W_B$ are determined 728 using Equation (1).

At this time, the training process 700 has modeled the channels and the necessary transfer functions needed to sufficiently shorten the channel length so as to produce the target channel (b) with the delay (d). However, the training process 700 then operates to compute 730 an error of the thus determined model (e.g., TEQ model) with the determined filter taps $W_A$ and $W_B$. The error is determined by the energy of the residual r(z).

At this point, the delay (d) is modified 732 and blocks 728–730 are repeated 732 to determine another error amount for the determined model with the different delay (d). Thereafter, the training process 700 selects 734 the delay (d) and filter taps $W_A$ and $W_B$ of the determined model with the minimum error amount. Following block 734, the training process 700 is complete and ends.

Another approach to training is referred to data driven training. With this approach, it is assumed that the impulse responses of the channels are unknown. Therefore, the premise of data driven training is that a known data sequence $\{X_k\}$ is sent through the channel and the time domain equalizer (TEQ) and then the output is compared with the input sequence convolved with the desired response.

The training approaches assume that the target channel, $\{b\}_{k=0}^{L-1}$ is given to us apriori. This is not a serious limitation since in the poly-path scenario one could train to any given target.

It is desired to estimate $\{w_k\}_{k=0}^{M-1}$, such that $D^\Delta y(D) \approx \tilde{y}(D)$, i.e., $\tilde{y}_{k+\Delta} = y_k$, $k \geq 0$. In other words want to approximately solve the system of equations:

$$\sum_{j=0}^{M-1} w_j y^{k-j} = \tilde{y}^{k+\Delta} \quad k = 0, 1, 2, \ldots,$$

$$y_k^T w = \tilde{y}^{k+\Delta} \quad k = 0, 1, 2, \ldots,$$

where $y_k = [y_k, \ldots, y_{k-L+1}]^T$ and $w = [w_0, \ldots w_{L-1}]^T$. In a matrix form, this collection of equations is the same as:

$$Yw = \tilde{y}$$

where Y is the Toeplitz matrix $[y_0, \ldots,]^T$ and $\tilde{y} = [\tilde{y}_k, \ldots, \tilde{y}_{k-L+1}]^T$.

This problem is solved for over a set of delays Æ, and the delay corresponding to the minimum error chosen.

In the poly-path setting, the system of equation becomes $$\sum_{p=1}^{P}\sum_{j=0}^{M-1} w_j^p y_{k-j}^p = \tilde{y}^{k+\Delta} \quad k = 0, 1, 2, \ldots,$$

$$\sum_{p=1}^{P} y_k^p w^p = \tilde{y}^{k+\Delta} \quad k = 0, 1, 2, \ldots,$$

$$\sum_{p=1}^{P} Y^p w^p = \tilde{y}$$

where $y_k^p = [y_k^p, \ldots, y_{k-L+1}^p]^T$, the output sequence associated with the p-th path, $w^p = [w_o^p, \ldots, w_{L-1}^p]^T$, the TEQ taps associated with the p-th path and $Y^p$ is the Toeplitz matrix of the p-th path.

If one defines $w = [w^1, \ldots, w^P]^T$ and the Toeplitz Block $Y = [Y^1 \ldots Y^P]$, where each of the $Y^p$'s is Toeplitz, then the above equation becomes:

$$Yw = \tilde{y}$$

All training methods LMS, MLS and RLS essentially solve this system of equations. Since most training methods, apart form Fast RLS, do not utilize the Toeplitz Block of data matrix Y, one might pretend to have a one-dimensional setting and then reinterpret the results. In the case of Fast RLS one would have to revert back to the Toeplitz Block structure.

The data driven training can use a number of different estimation approaches, including least-means-squares (LMS), means-least-squares (MLS), recursive-least-squares (RLS) and fast recursive-least-squares (fast RLS).

Figure 8:
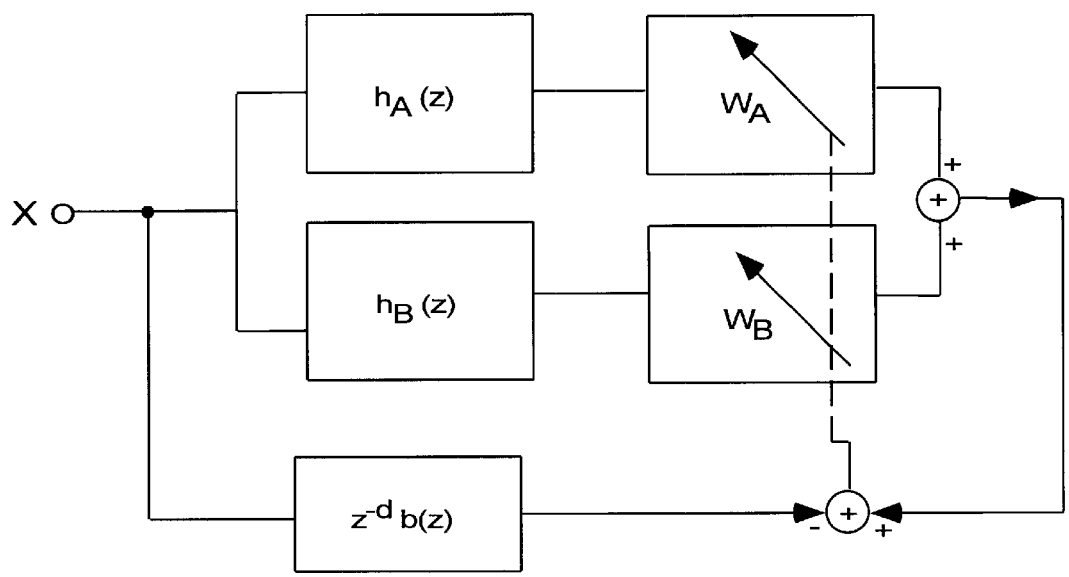
FIG. 8 is a block diagram of a training system used to update the filter taps based on an error amount.

As previously noted, in the training process a known data sequence is transmitted. One embodiment of data driven training can be performed as follows. The data received at the remote receiver for each of the effective channels $Y_A$ and $Y_B$ are placed in an array much like the channels $h_A$ and $h_B$ are placed in the array [a] in the Equation (1). However, because the phase at which these values $Y_A$ and $Y_B$ are placed in the array is unknown a recursive approach is required. In any case, to get the target channel (b), the filter taps for the FIR filters $W_A$ and $W_B$ can be estimated with a RLS technique. The recursive nature of the process then proceeds through iterations to update the accuracy of the values of $Y_A$ and $Y_B$. Then, using this model, the training process determines the amount of error present with the model. The determined error amount is then used with a LMS technique to further update the filter taps $W_A$ and $W_B$. Hence, according to this approach, the training process initially begins with a fast RLS then completes with a LMS technique. FIG. 8 is a block diagram of a training system used to update the filter taps $W_A$ and $W_B$ based on the determined error amount.

Transmitter Side with Time Domain Equalization

According to another aspect of the invention, a time-domain equalizer (TEQ) unit is placed in a transmitter instead of a receiver. The advantages of placing the TEQ at the transmitter are reduction in noise enhancement and ability to shift power requirements between transmitter-receiver pairs.

Conventionally, a TEQ unit was placed in receivers of a data transmission system. In a hybrid data transmission system providing bi-directional data transfer, receivers at both a central transmission side (e.g., an optical network side (ONU) side) and a remote receiver side would include a time domain equalizer (TEQ) unit. As an example, FIG. 1B illustrates the TEQ unit 112 in a receiver at the remote receiver side of the multicarrier modulation system 100. In contrast, according to this aspect of the invention, a time domain equalizer (TEQ) unit is placed in a transmitter of the remote receiver side. The TEQ unit utilized with this aspect of the invention may be a single-path TEQ or may be a poly-path TEQ.

One advantage of this aspect of the invention is the reduction in the amount of power consumed by a transmitter at an ONU side of a data transmission system. Typically, the power requirements at an ONU are restricted and therefore require power management to be within the budgeted amount of power. Hence, according to this aspect of the invention, power consumption at the ONU is decreased which facilitates meeting the budgeted amount of power available at the ONU. Namely, the TEQ unit now does not consume power at the ONU but instead at the remote receiver where the power consumption is less restricted.

Another advantage of moving the TEQ unit to the remote receiver is that noise enhancement, which occurs due to the presence of the TEQ unit at the receiver prior to a demodulation device (such as a FFT unit), can be eliminated. Conventionally, at the transmitter side or ONU site the transmission power on each bit was scaled to be the same; however, with the TEQ unit no longer at the transmitter side, the power distribution over the various frequency tones is not constant and thus the scaling would be altered such that the transmission power ends up being substantially constant but the amount of scaling for each tone would depend upon the number of bits as well as the filter taps $W_A$ and $W_B$.

Figure 9:
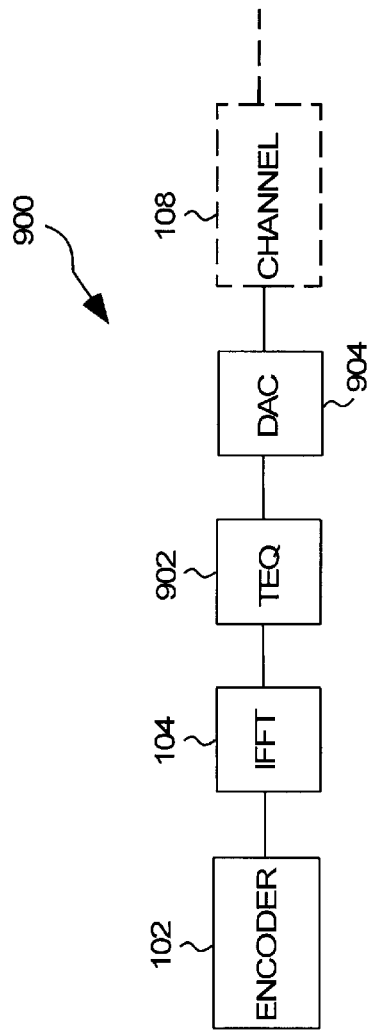
FIG. 9 is a block diagram of a transmitter associated with a remote receiver device according to a basic embodiment of the invention.

FIG. 9 is a block diagram of a transmitter 900 associated with a remote receiver (transceiver) device according to a basic embodiment of the invention. According to this aspect of the invention, the transmitter 900 includes a time domain equalizer (TEQ) unit 902 in the transmitter side of the remote receiver device. The transmitter side 900 couples to the channel 108 and also includes various conventional components including the encoder 102 and the IFFT unit 104. The time domain signals produced by the IFFT unit 104 are supplied to the TEQ unit 902. The TEQ 902 operates as a time domain equalizer normally operates to reduce attenuation and phase distortion between carriers. The equalized signals output from the TEQ unit 902 are supplied to a digital-to-analog converter (DAC) 904. The analog signals produced by the digital-to-analog converter (DAC) 904 are then transmitted over the channel 108. The TEQ unit 904 may be either a single-path TEQ or a poly-path TEQ.

Figure 10:
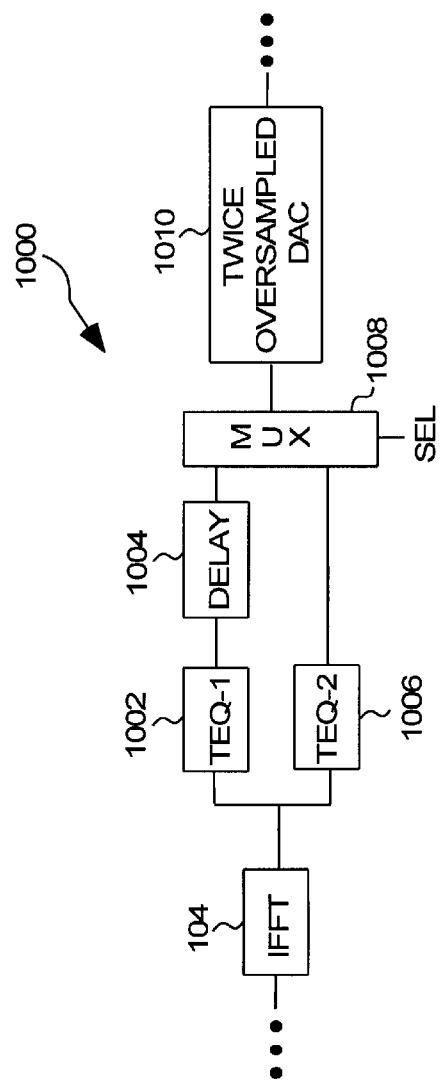
FIG. 10 is a block diagram of a portion of a transmitter according to an embodiment of the invention.

FIG. 10 is a block diagram of a portion of a transmitter 1000 according to an embodiment of the invention. The transmitter 1000 illustrated in FIG. 10 includes a poly-path TEQ. The transmitter 1000 includes the IFFT unit 104 that produces time domain signals. The time domain signals are then supplied to first and second paths of the poly-path TEQ. The first path includes a time domain equalizer (TEQ-1) 1002 and a delay unit 1004. The second path includes a time domain equalizer (TEQ-2) 1006. The equalized signals from the first and second paths are then supplied to a multiplexer 1008. The output of the multiplexer 1008 is an oversampled time domain signal carrying data to be transmitted. The multiplexer 1008 is operated by a select signal (SEL) to interleave the signals from the first and second paths of the poly-path TEQ. The interleaved time domain signals are then converted to analog signals by a digital-to-analog converter (DAC) 1010. Given that the multiplexer 1008 is operating in an oversampled manner, the digital-to-analog converter (DAC) 1010 also operates in an oversampled manner. The analog signals produced by the DAC 1010 are then transmitted over the channel 108. As the result, a remote receiver device that operates in a bi-directional manner includes a TEQ unit at its receiver side and a TEQ unit at its transmitter side.

Figure 11:
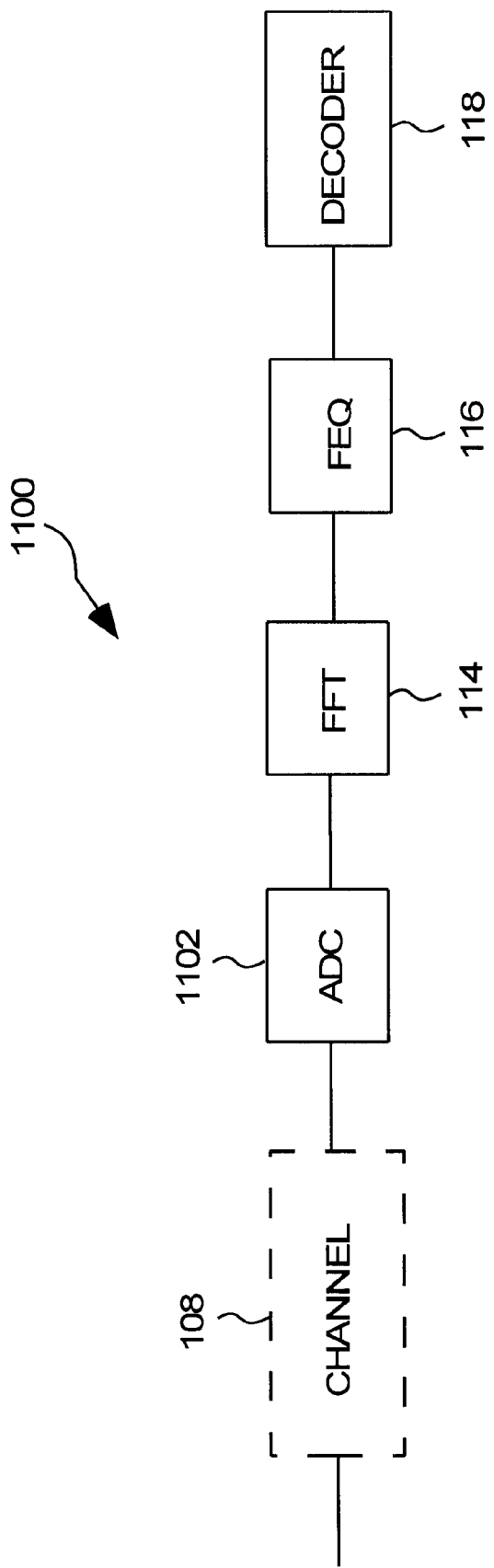
FIG. 11 is a block diagram of a portion of a receiver located at a central office side of a data transmission system.

FIG. 11 is a block diagram of a portion of a receiver 1100 located at a central office side (e.g., ONU side) of a data transmission system. According to this aspect of the invention, the receiver 1100 does not include a TEQ unit. The received signals from the channel 108 are supplied to an analog-to-digital converter (ADC) 1102. The analog-to-digital converter (ADC) 1102 preferably operates to select one of the sampling phases associated with the oversampled received data when transmitted by the transmitter 1000 in a remote receiver device. The digital signals produced by the analog-to-digital converter (ADC) 1102 are then supplied to the FFT unit 114. The frequency domain signals produced by the FFT 114 are then supplied to the FEQ 116 where the frequency domain signals are equalized. Thereafter, the equalized signals are then supplied to the decoder 118. By not having the TEQ unit at the receiver 1100 of the central office side, the above-mentioned advantage of power consumption and noise enhancement result.

When the time domain equalizer (TEQ) is placed at the remote receiver side, the training process is slightly different. Namely, for the first training approach, the receiver side can operate to identify the channels and then send back the channel information to the transmit side or can than instead compute the FIR taps then send the taps back to the transmit side. The second training approach, data driven approach, is not as easily implemented because the training is normally done at the remote receiver and with the TEQ is placed at the transmitter, constant communication is required between the transmitter and the remote receiver which is burdensome.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for recovering data transmitted by a transmitter of a DMT transmission system, said apparatus comprising:

an analog-to-digital converter, said analog-to-digital converter receives transmitted analog signals and produces digital signals therefrom, the transmitted analog signals being time domain signals representing data transmitted;

a poly-path time domain equalizer operatively connected to said analog-to-digital converter, said poly-path time domain equalizer providing a plurality of paths for the received digital signals, performing time domain equalization on the received digital signals on the plurality of paths to produce equalized digital signals, and adding said equalized digital signals to produce combined equalized signals;

a multicarrier demodulator operatively connected to said poly-path time domain equalizer, said demodulator receiving the combined equalized digital signals and demodulating the combined equalized digital signals to produce digital frequency domain data; and a decoder operatively connected to said demodulator, said decoder operates to decode the digital frequency domain data to recover the data transmitted.

2. An apparatus as recited in claim 1, wherein said demodulator is a FFT unit.

3. An apparatus as recited in claim 1, wherein said poly-path time domain equalizer comprises:

a time domain equalizer for each of the paths of said poly-path time domain equalizer, each of the paths corresponding to a different effective channel over which different ones of the received digital signals are processed to produce a portion of the equalized digital signals; and an adder to add the portions of the equalized digital signals for each of the paths to produce a combined digital signal that is supplied to said demodulator.

4. An apparatus as recited in claim 3, wherein said time domain equalizer for each of the paths is a finite impulse filter having a plurality of taps.

5. An apparatus as recited in claim 3, wherein said analog-to-digital converter comprises a path analog-to-converter for each of the paths of said poly-path time domain equalizer, each of said path analog-to-digital converters operating to convert the received transmitted analog signals associated with the path and producing a portion of the digital signals therefrom.

6. An apparatus as recited in claim 5, wherein each of said path analog-to-digital converters operates at a different phase.

7. An apparatus as recited in claim 1, wherein said analog-to-digital converter is an oversampled analog-to-digital converter.

8. An apparatus as recited in claim 7, wherein said apparatus further comprises:

a demultiplexer operatively connected between said oversampled analog-to-digital converter and said poly-path time domain equalizer, said demultiplexer operating to interleave the digital signals to the paths of said poly-path time domain equalizer.

9. An apparatus as recited in claim 1, wherein the plurality of paths provided by said poly-path time domain equalizer is an integer number greater than one.

10. A method for shortening an effective channel length of an actual channel in a DMT data transmission system, said method comprising the operations of:

receiving analog signals transmitted over the actual channel using DMT modulation;

converting the received analog signals to digital signals;

forming a plurality of effective channels from the received analog signals;

providing a FIR filter for each of the effective channels;

determining filter taps for each of the FIR filters such that an overall effective channel length is shortened;

shortening the overall effective channel length using the FIR filters associated therewith and using a different set of the determined filter taps for each of the FIR filters;

applying the digital signals associated with each of the effective channels to the respective FIR filters, each of the FIR filters receiving a different set of determined filter taps, and each of the FIR filters producing equalized digital signals for one of the effective channels; and combining the equalized digital signals for each of the effective channels.

11. A method as recited in claim 10, wherein each of the effective channels has a different channel length, and wherein said forming of the effective channels includes sampling the digital signals at a first phase to obtain the digital signals applied to a first of the effective channels, and sampling the digital signals at a second phase to obtain the digital signals applied to a second of the effective channels.

12. A method as recited in claim 10, wherein said determining of the filter taps for each of the FIR filters comprises:

choosing a target channel having a sufficiently short channel length; and adaptively determining the filter taps for each of the FIR filters at the same time to substantially yield the target channel.

13. A method as recited in claim 12, wherein said adaptively determining of the filter taps is performed in accordance with the following equation:

$$[h]\cdot[W]=[b]+[r]$$

where [h] models the effective channels, [W] contains the filter taps for each of the FIR filters, [b] represents the target channel, and [r] represents a residual.

14. A remote receiver apparatus for a data transmission system, said remote receiver apparatus comprising:

a transmitter side including at least, an encoder, said encoder operating to encode data to be transmitted from said remote receiver apparatus;

a multicarrier modulator operatively connected to said encoder, said multicarrier modulator operating to modulate the encoded data to produce modulated signals;

a time domain equalizer operatively connected to said multicarrier modulator, said time domain equalizer operating to performs time domain equalization on the modulated signals to produce equalized digital signals; and a digital-to-analog converter operatively connected to said time domain equalizer, said digital-to-analog converter receiving the equalized digital signals and produces analog signals to be transmitted therefrom;

a receiver side including at least, an analog-to-digital converter, said analog-to-digital converter receiving analog signals associated with data that has been transmitted and producing digital signals therefrom;

a time domain equalizer operatively connected to said analog-to-digital converter, said time domain equalizer providing a plurality of paths for the received digital signals, performing time domain equalization on the plurality of received digital signals to produce equalized digital signals, and adding said equalized digital signals to produce combined equalized signals;

a multicarrier demodulator operatively connected to said time domain equalizer, said demodulator receiving the combined equalized digital signals and demodulating the equalized digital signals to produce demodulated data; and a decoder operatively connected to said multicarrier demodulator, said decoder operating to decode the demodulated data to recover the data transmitted; and a hybrid circuit operatively connecting said transmitter side and said receiver side to a channel.

15. A remote receiver apparatus as recited in claim 14, wherein said time domain equalizer in said transmitter side is a poly-path time domain equalizer, said poly-path time domain equalizer provides a plurality of paths for the modulated signals and performs time domain equalization on the modulated signals on both of the paths to produce the equalized digital signals.

16. A remote receiver apparatus as recited in claim 15, wherein said modulator is an IFFT, and said demodulator is an FFT.

17. A remote receiver apparatus as recited in claim 15, wherein said time domain equalizer in either or both said receiver side and said transmitter side is a poly-path time domain equalizer that performs time domain equalization on a plurality of paths.

* * * * *